Aug. 14, 1956     A. G. McNEILL     2,758,506
AUXILIARY SPECTACLES
Filed Aug. 30, 1954     2 Sheets-Sheet 2
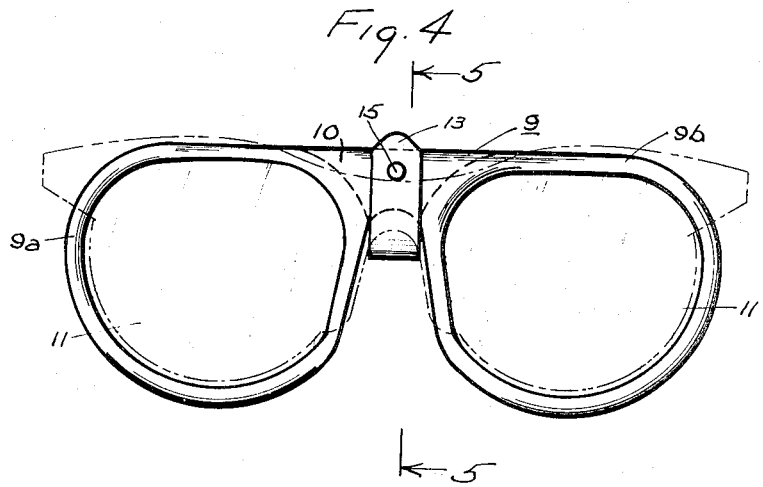
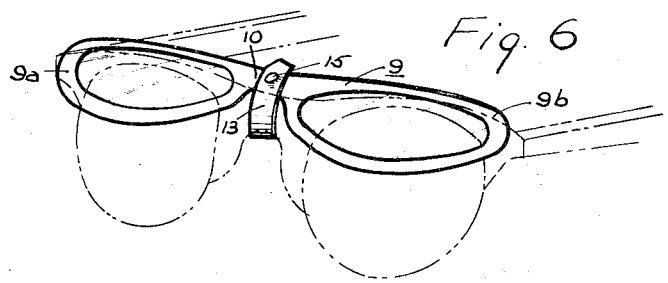
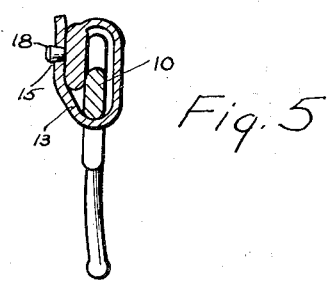
INVENTOR.
ALBERT G. MCNEILL
BY
HIS ATTORNEY

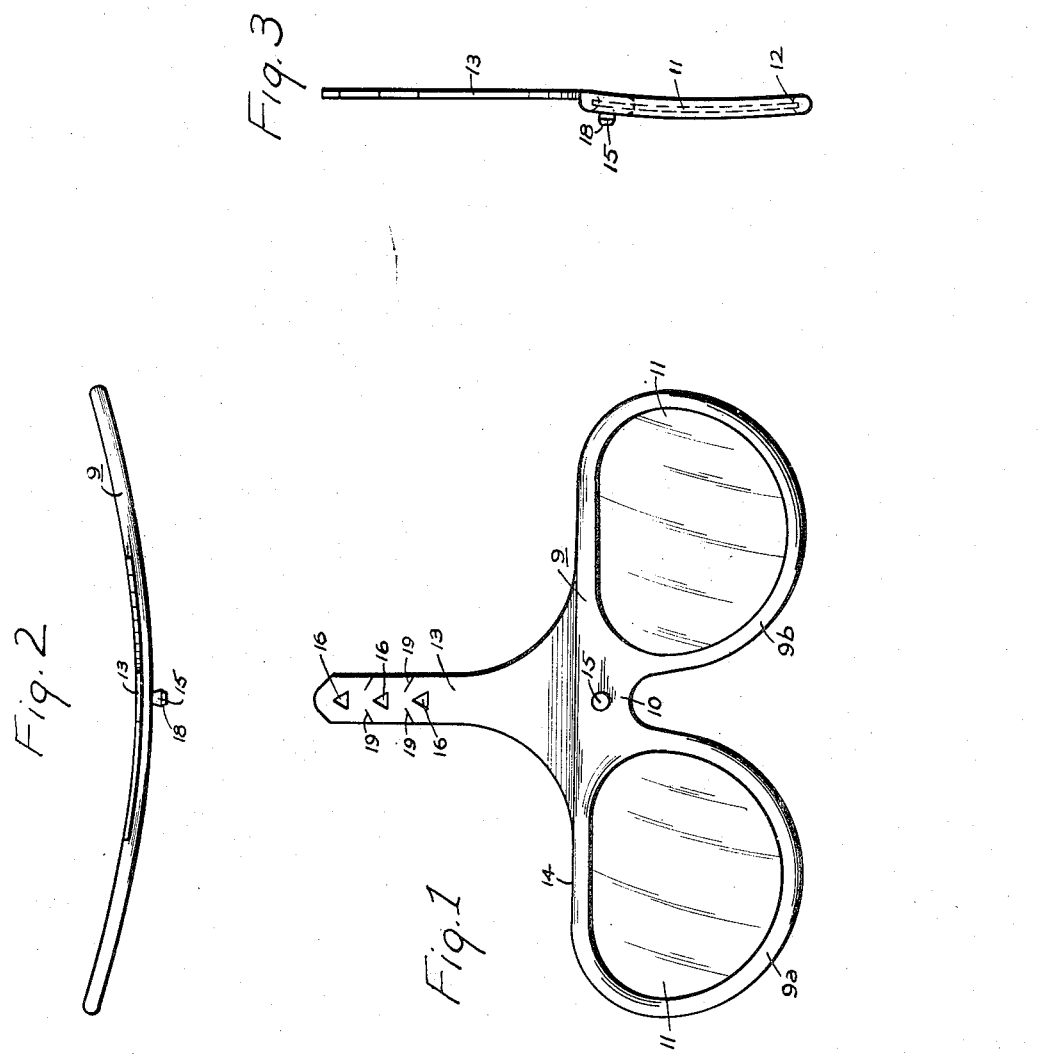

United States Patent Office 2,758,506
Patented Aug. 14, 1956

2,758,506

AUXILIARY SPECTACLES

Albert G. McNeill, Maple Glen, Pa., assignor to Bachmann Brothers Inc., Philadelphia, Pa., a corporation of Pennsylvania Application August 30, 1954, Serial No. 453,104

7 Claims. (Cl. 88—41)

This invention relates to auxiliary spectacles and more particularly to sun glasses intended for use in conjunction with conventional optical spectacles.

Auxiliary sun glasses that are presently known are of two general types. In one type a plurality of flat leaf springs are arranged about the periphery of the auxiliary frame for engagement with the conventional spectacles. A principal disadvantage of this construction is that the springs, which are invariably of steel construction, corrode readily, and, because of the difference in coefficients of expansion between the spring and the associated frame, which are commonly of rigid plastic material, the springs often loosen and fall out, thus rendering the sun glasses useless. Moreover, the springs have a tendency to obscure the optical lenses, and thus limit the field of vision. In addition, springs used for this purpose have been known to distort and otherwise mar relatively expensive optical lenses. In another type of auxiliary spectacles, utilized for the purpose of reducing glare from the sun, a plurality of lugs are formed integrally with the lens frame and disposed about the entire periphery of the frame. Mounting of this type of auxiliary frame on the optical lens frame is afforded by distorting some of these lugs until the remainder can be moved into the position of engagement with the perriphery of the optical frame. Because of the need for distortion of the lugs in the process of mounting the auxiliary frames on the optical frames the lugs are readily bent beyond their elastic limit and, as a result, the lugs break off and the auxiliary frames become useless. An additional disadvantage of the latter type of auxiliary frame is that the lugs project into contact with the face of the wearer to his annoyance, and, furthermore constitute a visional distraction. In addition, auxiliary frames of the latter type must be fitted to a particular size of optical frame.

With the foregoing in mind a principal object of the invention is to provide an auxiliary spectacles frame which is characterized by conventional form and generally improved functional characteristics.

A further object of the invention is to provide an auxiliary spectacles frame of the stated type which is capable of fitting a plurality of sizes of optical frames.

Another object of the invention is to provide a device of the stated character which may be mounted on conventional optical frames without causing damage to the latter.

An additional object of the invention is to provide auxiliary spectacles of the stated type which are relatively light in weight, non-toxic, pleasant to touch, economical of manufacture, and which are completely efficient and effective in operation and use.

A still further object of the invention is to provide a device of the above-mentioned type which may be mounted upon conventional optical frames and worn without interference with the vision of the wearer.

A final object of the invention is to provide auxiliary spectacles which may readily be used as an eyeshade.

Various other more detailed objects and advantages of the invention such as arise in carrying out the above-noted concepts in a practical embodiment will, in part, become apparent and will, in part, be hereinafter stated as the discussion of the invention proceeds. For a full and more complete understanding of the invention, reference may be had to the following detailed description and to the accompanying drawings wherein similar numerals refer to similar parts throughout the several views and in which:

Fig. 1 is a front elevational view of a pair of auxiliary spectacles made in accordance with the present invention;

Fig. 2 is a plan view of the auxiliary spectacles in Fig. 1;

Fig. 3 is a view in side elevation of the spectacles of Fig. 1;

Fig. 4 is a front elevational view showing the auxiliary spectacles of the present invention in position for use, the conventional optical frames being shown in dot and dash lines;

Fig. 5 is an elevational view, partly in section, taken substantially on line 5—5 of Fig. 4;

Fig. 6 is a view in perspective of the auxiliary spectacles of the present invention shown mounted in position for use as an eyeshield.

With reference to the drawings and in particular to Fig. 1 the embodiment of the invention therein disclosed comprises essentially a frame 9 of flexible plastic, such as polyethylene or the like, and including individual sections 9a and 9b for mounting a pair of lenses 11 in an internal groove 12, as shown best in Fig. 3. A bridge 10 joins the frame sections 9, 9a. With reference now to Fig. 2 the frame 9 is formed arcuately to afford snug engagement when mounted on optical frames of various sizes and configurations.

According to the present invention there is formed integrally with the frame 9 a tab or tang 13 which extends from the upper edge 14 of the frame 10. This tab is designed to be wrapped around the bridge of conventional optical frames and is secured in position by means of a lug 15, which is formed integrally with the front face of the bridge 10 and is received in one of a plurality of triangular longitudinally spaced apertures 16 at the outer extremity of the tab. The lug 15 is shown with an enlarged outer end for positive engagement with the tab and desirably takes a frusto-conical form with the outermost edges 18 beveled for easy reception of the lugs 15. The particular configuration of the lug 15 in conjunction with the triangular shape of the apertures 16 permits positive engagement of the outer end of the tab with the lug, with result that the probability of accidental disengagement of the auxiliary frame from the optical frame is effectively precluded. It will be noted that a plurality of pairs of angularly extending longitudinally spaced slits 19 are provided in the outer end of the tab 13. These slits extend from the side edges of the tab inwardly to points short of the center line, leaving the central area undisturbed. The purpose of these slits is to provide for effective mounting of the auxiliary spectacles frame of the present invention on a plurality of types of conventional optical frames. For instance, spectacles of the horn-rim type require a tab of greater length because of the relatively large cross-section of its bridge, and thus the outermost of the apertures 16 would be employed. In the case of spectacles of the metal frame or rimless type, however, the bridge members are often of limited cross-section and consequently the lug 15 would more conveniently be inserted in the innermost of the apertures 16. For optical frames having a bridge of average cross-section the intermediate aperture would, of course, be used. Since the unused portion of the tab, in this instance, would cause a visional distraction, the outer end of the tab may readily be removed by tearing in line with any pair of slits as may be required.

*Operation*

While the operation of the device of the present invention will no doubt be apparent from the above description the manner of mounting the auxiliary spectacles frame herein disclosed comprises the steps of arranging the auxiliary frame with the concave side in abutting relation to the front of the conventional optical frame with the tab 13 extending upwardly, wrapping the tab around the top surface of the optical frame bridge and thence around the back and underside of the bridge, drawing the tab into snug engagement with the bridge, and pressing the tab in the area of one of the apertures 16 so that the lug 15 is received in an aperture affording the most snug engagement of the tab with the optical frame bridge. It is sometimes desirable, such as, for instance, when driving an automobile, to protect the eyes from the rays of the sun while at the same time observe changes in traffic lights. As shown in Fig. 6, the present auxiliary frames may be positioned in close relation to the conventional optical frames, and are retained in this position by the frictional engagement of the tab with the bridge of the optical frame.

The present invention provides an auxiliary spectacles frame suitable for use in conjunction with protective lenses or with colored lenses. The present invention is characterized by adaptability to optical frames of a variety of different sizes and configurations, is relatively light in weight, and, further, may be readily attached to optical frames without obstructing the vision of the wearer. The tab 13, which like the frame 9, with which it is integrally formed desirably is made from a flexible plastic metal, such as polyethylene or the like, and will withstand repeated flexing without snapping off. An important characteristic of polyethylene plastic when used for this purpose is that it is characterized by a pleasant feel, and its flexible characteristic permits a firm frictional engagement with the bridge of the optical frame when the auxiliary frame is in the position shown in Fig. 4. Moreover, the tension resulting from the arrangement of the bowed auxiliary frame in abutting parallel relation to the optical frame permits the arrangement of the auxiliary frame in the position shown in Fig. 6, in which position the device of the present invention is particularly effective in diffusing high sun rays, such as, for instance, at noon time.

Although the present description of this invention has been limited to the above described embodiment, other various variations thereof are possible without departing from the spirit of the invention. It is therefore not intended that the invention be limited to the particular embodiment disclosed but only to the inventive concepts as defined in the appended claims.

What is claimed is:

1. Auxiliary spectacles for use in conjunction with conventional spectacles comprising a pair of lenses, a frame for mounting said lenses in predetermined fixed relation, said frame being arcuate in configuration and having an elongated tab extending from the top edge thereof and adapted to be wrapped around a bridge of an optical frame for mounting of the auxiliary frame in fixed relation with respect to the optical frame.

2. Auxiliary spectacles for use in conjunction with conventional spectacles comprising a pair of lenses, a frame for mounting said lenses, said frame including a bridge for maintaining said lenses in predetermined fixed relation, said frame being arcuate in configuration, an elongated tab formed integrally with said frame in the area of said bridge for drawing said frame into snug engagement with the front surface of the conventional spectacles, and a lug disposed on the front of said bridge and adapted to be secured to said tab, whereby upon wrapping of the tab about the bridge of the conventional spectacles, the frame will be maintained in predetermined fixed relation with respect to the conventional spectacles.

3. Auxiliary spectacles for use in conjunction with conventional optical spectacles comprising a pair of lenses, a frame for mounting said lenses, said frame including a bridge for mounting said lenses in predetermined fixed relation, an elongated tab formed integrally with said bridge and adapted to envelop the bridge of the optical spectacles, and means disposed on the front surface of the auxiliary spectacles bridge and cooperating with said tab for affording connection of the auxiliary spectacles and the optical spectacles.

4. Auxiliary spectacles for use in conjunction with conventional optical spectacles comprising a pair of lenses, a frame for mounting said lenses, said frame including a bridge formed integrally therewith, an elongated tab formed integrally with said bridge, a lug disposed on the front surface of the bridge, said tab being provided with a plurality of longitudinally spaced apertures and being adapted to be wrapped around the bridge of the optical spectacles for selective engagement of said lug with one of said apertures and consequent retention of the auxiliary spectacles and the optical spectacles in fixed relation.

5. Auxiliary spectacles for use in conjunction with conventional optical spectacles comprising a pair of lenses, a frame for mounting said lenses, said frame including a bridge formed integrally therewith, an elongated tab formed integrally with said bridge, a lug disposed on the front surface of the bridge, said tab being provided with a plurality of longitudinally spaced apertures and being adapted to be wrapped around the bridge of the optical spectacles for selective engagement of said lug with one of said apertures and consequent retention of the auxiliary spectacles and the optical spectacles in fixed relation, said tab being further provided with a plurality of pairs of slits for affording selective detachment of as much of the tab as is not needed.

6. Auxiliary spectacles for use in conjunction with conventional optical spectacles comprising a pair of lenses, a frame for mounting said lenses, said frame being formed of a flexible plastic and including a bridge formed integrally therewith, an elongated tab formed integrally with said bridge, a lug disposed on the front surface of the bridge, said tab being provided with a plurality of longitudinally spaced apertures and being adapted to be wrapped around the bridge of the optical spectacles for selective engagement of said lug with one of said apertures and consequent retention of the auxiliary spectacles and the optical spectacles in fixed relation.

7. Auxiliary spectacles for use in conjunction with conventional optical spectacles comprising a pair of lenses, a frame for mounting said lenses, said frame being formed of polyethylene and including a bridge formed integrally therewith, an elongated tab formed integrally with said bridge, a lug disposed on the front surface of the bridge, said tab being provided with a plurality of longitudinally spaced apertures and being adapted to be wrapped around the bridge of the optical spectacles for selective engagement of said lug with one of said apertures and consequent retention of the auxiliary spectacles and the optical spectacles in fixed relation.

References Cited in the file of this patent

UNITED STATES PATENTS

| Number | Name | Date |
|---|---|---|
| 1,668,323 | King | May 1, 1928 |
| 1,985,668 | Peavey | Dec. 25, 1934 |
| 2,212,596 | Fuller | Aug. 27, 1940 |
| 2,300,364 | Wagner | Oct. 27, 1942 |
| 2,326,787 | Lorig | Aug. 17, 1943 |